(12) United States Patent
Yang et al.

(10) Patent No.: US 12,339,893 B1
(45) Date of Patent: Jun. 24, 2025

(54) SYSTEMS AND METHODS FOR MAINTAINING A RANDOM SAMPLE OF DOCUMENTS

(71) Applicant: RELATIVITY ODA LLC, Chicago, IL (US)

(72) Inventors: Eugene Yang, Chicago, IL (US); Evan Curtin, Brooklyn, NY (US); Kenneth Tam, Chicago, IL (US); Jeffrey Charles Gilles, Fairfax, VA (US); Sean Underwood, Chicago, IL (US)

(73) Assignee: RELATIVITY ODA LLC, Chicago, IL (US)

( * ) Notice: Subject to any disclaimer, the term of this patent is extended or adjusted under 35 U.S.C. 154(b) by 0 days.

(21) Appl. No.: 18/391,099

(22) Filed: Dec. 20, 2023

(51) Int. Cl.
*G06F 7/00* (2006.01)
*G06F 16/35* (2019.01)
*G06F 16/383* (2019.01)

(52) U.S. Cl.
CPC ............ *G06F 16/383* (2019.01); *G06F 16/35* (2019.01)

(58) Field of Classification Search
CPC .............................. G06F 16/383; G06F 16/35
USPC .................................................. 707/600–899
See application file for complete search history.

(56) References Cited

U.S. PATENT DOCUMENTS

2017/0075525 A1* 3/2017 Audet ................... G06F 3/0482

* cited by examiner

*Primary Examiner* — Isaac M Woo
(74) *Attorney, Agent, or Firm* — MARSHALL, GERSTEIN & BORUN LLP

(57) ABSTRACT

Systems and methods related to maintaining a random sample of documents that is representative of a pool of documents are provided. As documents are ingested into the pool of documents, a random number may be assigned to the documents. The documents may then be sorted into an ordered list. As the documents in the pool are provided to a review platform for manual review, the documents may be included in a review queue based at least in part on the ordered list. As additional documents are added to the pool of documents, the new documents are interleaved into the ordered list to maintain the random and representative nature of the random sample.

20 Claims, 6 Drawing Sheets

$t_5$:

232c → $O_2$

| 1 | 2 | 2.1 | 3.1 | 3.2 | 4 | 5 | 6 | 6.1 | ... |
|---|---|---|---|---|---|---|---|---|---|
| Doc12 | Doc48 | Doc183 | Doc127 | Doc199 | Doc17 | Doc29 | Doc2 | Doc150 | ... |
| Rel | NR | Rel | NR | NR | NR | NR | Rel | | ... |

SYSTEMS AND METHODS FOR MAINTAINING A RANDOM SAMPLE OF DOCUMENTS

FIELD OF THE DISCLOSURE

The present disclosure generally relates to generating a random sample representative of a pool of documents and, more specifically, to maintaining the representative nature of the random sample as the size of the pool changes.

BACKGROUND

In various applications, a need exists to have a random sample of a pool of documents. In one such example, during a discovery process for a litigation, a producing party is required to produce a corpus of documents that meets the discovery conditions. Within this corpus of documents there may be hundreds of thousands, if not millions, of documents that need to be assessed for compliance with the discovery request. Given the large number of documents to assess, automated techniques are often applied to reduce the amount of manual review required to comply with discovery requests.

To facilitate automation of the electronic communication document review process, classifiers are often trained to automatically label the documents. One common way to determine whether a classifier is sufficiently trained is by determining the precision and/or recall of the classifier when applied to a validation set of documents. However, without a baseline of the true distribution of documents within the corpus of documents, it is difficult to assess whether the precision and/or recall of the classifier is accurate.

One way to generate this baseline is by obtaining a "richness sample" that is a random sample of the overall corpus of documents. By assessing the richness of the richness sample, one is able to verify that the precision and/or recall of the classifier is the appropriate value for the corpus of the documents.

However, in many scenarios, the number of documents in the corpus of documents changes over the course of the eDiscovery process, often in a non-random manner. Accordingly, the richness of the corpus of documents may also change over the course of the eDiscovery process. Thus, a richness sample taken at the onset of the eDiscovery process may not be representative of the corpus of documents at the end. As a result, a new richness sample would need to be generated to evaluate the recall and/or prevalence of the classifier.

Conventionally, this process involves developing a new random sample each time you want to assess the richness of the corpus of documents. As a result, the conventional process involves the additional manual review of documents for the purpose of having sufficient documents in the random sample or to rely upon less accurate measurements of precision and/or recall when evaluating the classifiers.

Accordingly, there is a need to maintain a random sample of documents in a manner that overcomes these and other limitations with the conventional techniques for generating random samples representative of a pool of documents.

BRIEF SUMMARY

In one aspect, a computer-implemented method for maintaining a random sample of documents is provided. The method includes (1) ingesting, via one or more processors, a first set of documents into a pool of documents; (2) sorting, via the one or more processors, the first set of documents into a random order to generate an initial ordering of the pool of documents; (3) providing, via the one or more processors, documents within the pool of documents to a review platform based at least in part upon the initial ordering of the pool of documents; (4) defining, via the one or more processors, the random sample of documents to be an initial set of documents within an ordering of the pool of documents associated with labels applied via the review platform, wherein the initial set of documents changes in size as additional documents are reviewed via the review platform; (5) ingesting, via one or more processors, a second set of documents into the pool of documents; and (6) interleaving, via the one or more processors, the second set of documents into the initial ordering of documents to generate an updated ordering of the pool of documents wherein the documents within the first set of documents remain in a same relative order with respect to other documents within the first set of documents.

In another aspect, a system for maintaining a random sample of documents is provided. The system includes (i) one or more processors; and (ii) one or more non-transitory memories storing processor-executable instructions. The instructions, when executed by the one or more processors, cause the system to (1) ingest a first set of documents into a pool of documents; (2) sort the first set of documents into a random order to generate an initial ordering of the pool of documents; (3) provide documents within the pool of documents to a review platform based at least in part upon the initial ordering of the pool of documents; (4) define the random sample of documents to be an initial set of documents within an ordering of the pool of documents associated with labels applied via the review platform, wherein the initial set of documents changes in size as additional documents are reviewed via the review platform; (5) ingest a second set of documents into the pool of documents; and (6) interleave second set of documents into initial ordering of documents to generate an updated ordering of the pool of documents wherein the documents within the first set of documents remain in a same relative order with respect to other documents within the first set of documents.

In another aspect, a non-transitory computer-readable storage medium storing processor-executable instructions, that when executed cause one or more processors to (1) ingest a first set of documents into a pool of documents; (2) sort the first set of documents into a random order to generate an initial ordering of the pool of documents; (3) provide documents within the pool of documents to a review platform based at least in part upon the initial ordering of the pool of documents; (4) define a random sample of documents to be an initial set of documents within an ordering of the pool of documents associated with labels applied via the review platform, wherein the initial set of documents changes in size as additional documents are reviewed via the review platform; (5) ingest a second set of documents into the pool of documents; and (6) interleave second set of documents into the initial ordering of documents to generate an updated ordering of the pool of documents wherein the documents within the first set of documents remain in a same relative order with respect to other documents within the first set of documents.

BRIEF DESCRIPTION OF THE DRAWINGS

FIG. 2C depicts an example process for removing documents from an ordered pool of documents, according to one embodiment.

DETAILED DESCRIPTION

The embodiments described herein relate to, inter alia, maintaining the representative nature of a random sample of documents as the pool of documents changes in size and/or variety. The systems and techniques described herein may be used during an eDiscovery process that is part of a litigation. Although the present disclosure generally describes the techniques' application to the eDiscovery and/or litigation context, other applications are also possible. For example, the systems and techniques described herein may be used in any context in which a random sample of documents is relied upon for evaluating the characteristics of a pool of documents.

Figure 1:
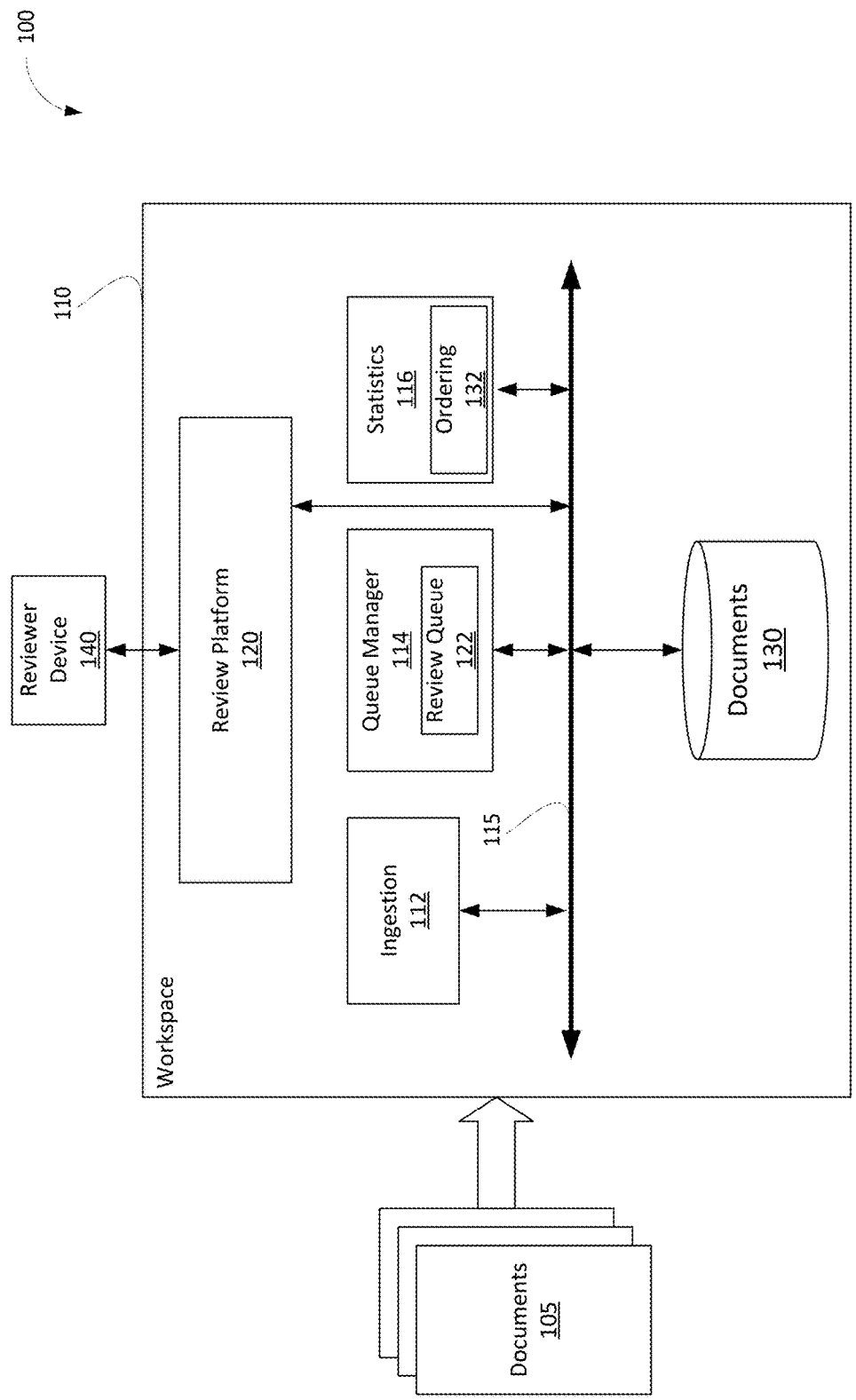
FIG. 1 depicts an example computing environment associated with processing a pool of documents, according to one embodiment.

FIG. 1 depicts an example computing environment 100 for processing a pool of documents, according to one embodiment. As illustrated, the computing environment 100 includes a workspace 110 associated with a pool of documents. The workspace 110 and/or the components thereof may be implemented as software modules within a cloud and/or distributed computing system (e.g., Amazon Web Services (AWS) or Microsoft Azure). Accordingly, the components of the workspace 110 may include separate logical addresses via which the components are accessible via a bus 115 or other messaging channel supported by the cloud computing system. In some embodiments, the workspace 110 includes multiple instances of the same component to increase the ability the parallelization for the various functions performed via the respective components.

As illustrated, the workspace 110 includes an ingestion module 112 configured to ingest a set of documents 105 into the workspace 110. The documents 105 may be any type of document (e.g., an email document, a word file, a text file, a file format associated with exported data from a communication application, an image file, a video file, a presentation file, an object, etc.) or subpart thereof (such as individual messages (such as text messages, Slack messages, etc.) included in a file representative of a conversation). In some scenarios, the "document" may refer to any entry in a list of items that is reviewed. It should be appreciated that in an eDiscovery process, documents 105 may be ingested into workspace 110 at different times as the documents 105 become available. As one example, as the scope of discovery may expand during a litigation. As another example, additional computing devices storing documents thereon may be found during the discovery process. Accordingly, documents 105 may be ingested into the workspace 110 at any time.

As part of the ingestion process, the ingestion module 112 may pre-process the documents 105, for example, to extract unstructured text included in the documents 105, to associate the documents with metadata fields (e.g., one or more entities associated with the document), assign the document a document identifier (a "DocID") and/or other types of pre-processing typical for the context of the pool of documents associated with the workspace 110. As it is used herein, the term "document" generally refers to a document object that include the actual document file as well any metadata associated therewith.

In addition to the routine processing, the ingestion module 112 may also associate each document 105 with a random number. In some embodiments, the ingestion module 112 invokes a random number generator configured to output a random number between 0 and 1. That said, any suitable random number generation technique may be utilized by the ingestion module 112. The ingestion module 112 may store the random number for each document 105 in a metadata field associated with the document. It should be appreciated that, in some embodiments, the field associated with the random number may not be accessible to end users of the workspace 110 (e.g., by not exposing the field to via an application programming interface (API) associated with documents maintained at the workspace 110). To this end, if the random number is accessible to end users, it may be possible for end users to game which documents are included in the random sample, thereby making the random sample less representative of the pool of documents as a whole.

After the ingestion module 112 finishes processing the documents 105, the ingestion module 112 may store the corresponding document in a database 130. In some embodiments, the database 130 is maintained within the workspace 110. In other embodiments, the database 130 may be an external object storage system (e.g., a cloud storage system) with which an I/O module (not depicted) of the workspace 110 interfaces with to store and/or retrieve documents associated with the workspace 110.

As illustrated, the workspace 110 also includes a statistics module 116 configured to analyze the documents in the pool of documents maintained in the database 130. For example, the statistics module 116 may be configured to train one or more classifiers (not depicted) based on labels applied obtained from reviewers via a review platform 120. For example, in the eDiscovery context, the label may indicate a responsiveness to a discovery request and/or whether or not a document is privileged.

Additionally, the statistics module 116 may be configured to generate statistics regarding the pool of documents and/or the performance of the classifiers (e.g., precision, recall, elusion, richness, and/or any other statistic commonly associated with pools of documents).

In one aspect, the statistics module 116 may be configured to maintain an ordering 132 of the pool of documents. The ordering 132 may sort the pool of documents based upon the random numbers assigned to each document by the ingestion module 112 (e.g., in ascending or descending order). Accordingly, in some embodiments, the ordering 132 may be a vector of DocIDs, the random numbers assigned thereto, and any labeling decisions associated with the classifier under test. As described elsewhere herein, as additional documents 105 are ingested into the workspace 110, the statistics module 116 may interleave the new documents 105 within the ordering 132.

According to embodiments disclosed herein, the statistics module 116 may maintain a random sample of documents representative of the pool of documents maintained in the database 130. In embodiments disclosed herein, the statistics module 116 may define the random sample documents to be the initial set of documents in the ordering 132 associated with labeling decisions. As the documents are reviewed via the review platform 120 and labeling decisions are applied to additional documents, the initial set of documents also grows, thereby increasing the size and/or variety of the random sample.

The statistics module 116 may interface with a queue manager 114 to generate a review queue 122 of documents from the pool of documents based upon the ordering 132. Depending on the particular context, the statistics module 116 may order the documents in the review queue differently. For example, in a priority review scenario, the statistics module 116 may generally prioritize documents that are most likely to be responsive to an inquiry (as determined by a classifier). That said, in this example, a percentage of documents (e.g., 5%, 10%, 15%, or a user-defined percentage) may be randomly selected documents to avoid overbiasing the likely responsive documents in the training set. Other types of review contexts may have alternative selection criteria for inserting documents in the review queue 122.

Regardless of the particular selection algorithm, when the statistics module 116 determines that a random document is to be inserted into the review queue 122, the statistics module 116 may select the first unlabeled document in the ordering 132. As a result, when random documents are inserted into the review queue 122 to train a classifier, the review of the random document also increases the size and/or variety of the random sample. Thus, the statistics module 116 may be able to maintain the random sample of documents without the need to conduct additional manual review of documents specifically for the purposes of generating the random sample.

As illustrated, the workspace 110 includes a review platform 120 to facilitate manual review of the documents in the review queue 122. More particularly, the review platform 120 may be configured to present one or more graphical user interface (GUIs) on a reviewer device 140 via which a reviewer applies one or more labeling decisions to the documents in the review queue 122. Accordingly, the review platform 120 and the reviewer device 140 may be communicatively coupled via one or more communication networks. For example, the communication networks one or more wired and/or wireless local area networks (LANs), and/or one or more wired and/or wireless wide area networks (WANs), such as the Internet.

The reviewer device 140 may be a laptop computer, a desktop computer, a tablet, a smartphone, or any other suitable type of computing device for reviewing documents. While FIG. 1 shows only a single reviewer device 140, it is understood that multiple different reviewer devices 140 may be in remote communication with the review platform 120 of the workspace 110.

In response to a reviewer logging into a review application supported by the review platform 120, the review platform 120 may send a request to the queue manager 114 to receive a batch of documents to present to the reviewer. Accordingly, the queue manager 114 may query the review queue 122 to identify the set of documents at the front of the queue 122. If the identified documents are stored in local storage (not depicted) of the workspace 110, the queue manager 114 may provide a storage location to the review platform 120 at which the documents may be obtained. Otherwise, the queue manager 114 may fetch the identified documents from the database 130 for storage in the local storage.

The review platform 120 may then present the documents to the reviewer via a GUI of the review application. As the user reviews the documents via the reviewer device 140, the reviewer provides one or more labeling decisions on the presented documents. After obtaining the labeling decision, the review platform 120 may update the reviewed documents to include an indication of the labeling decisions. If the reviewer reviewed a document selected from the ordering 132, updating the reviewed document to include the labeling decision may increase the size and/or variety of the random sample.

According to aspects, the statistics module 116 may monitor the size and/or variety of the random sample to update one or more statistics associated with the pool of documents and/or the classifiers. For example, the statistics module 116 may determine a richness of responsive documents in the random sample (the number of responsive documents divided by the size of the sample) after a threshold change in size of the random sample (e.g., every 50 documents, every 100 documents, every 250 documents, etc.). As a result, the statistics module 116 may be able to provide a current richness throughout the review process without the need to review additional documents for the sole purpose of generating a richness sample. Further, the ability to provide a richness metric throughout the review process enables the project manager to meaningfully interpret the training progress of the classifier, for example, by providing the contextual information needed to interpret the precision, recall, etc., associated with the classifier being trained. Similarly, the statistics module 116 may be able to track changes in richness over the course of the document review process to ensure that the richness of the random sample is sufficiently stable and thus more likely to be representative of the entire pool of documents.

It should be appreciated that FIG. 1 only depicts one example computing environment via which the disclosed techniques may be implemented. In alternative embodiments, the environment 100 and/or the workspace 110 may include additional, fewer, or alternative components and/or modules.

Figure 2A:
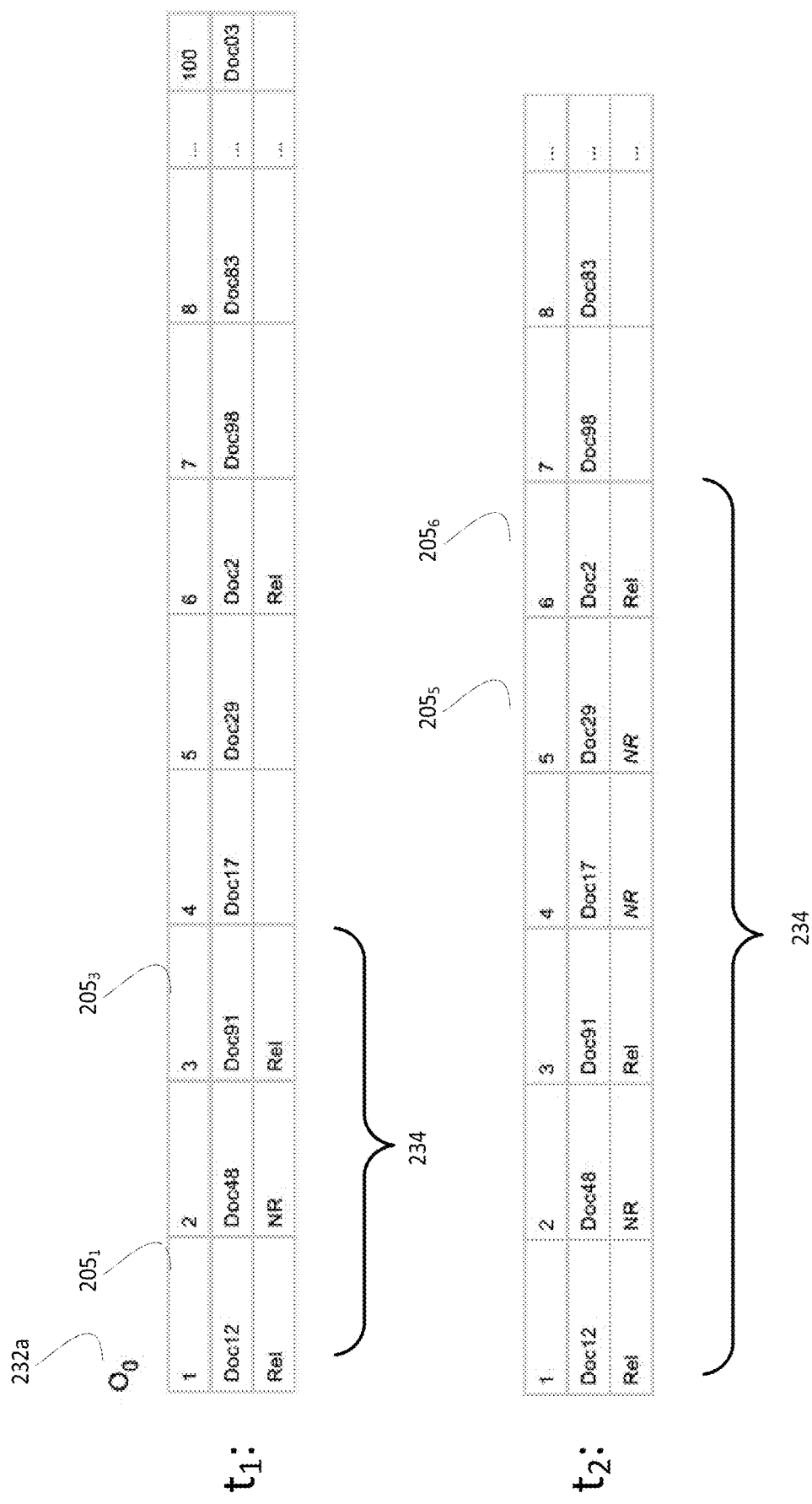
FIG. 2A depicts an example process for ordering a pool of documents, according to one embodiment.
Figure 2B:
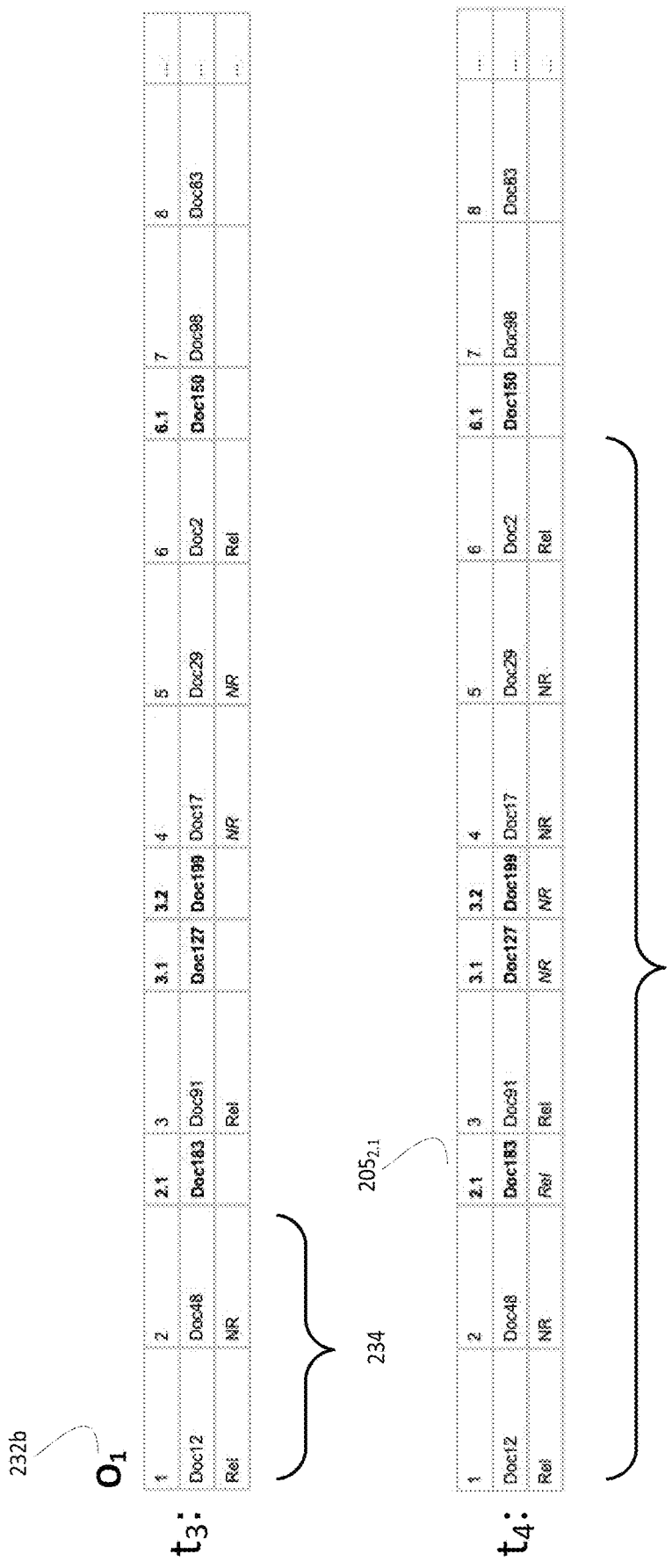
FIG. 2B depicts an example process for adding new documents to an ordered pool of documents, according to one embodiment.
Figure 2C:
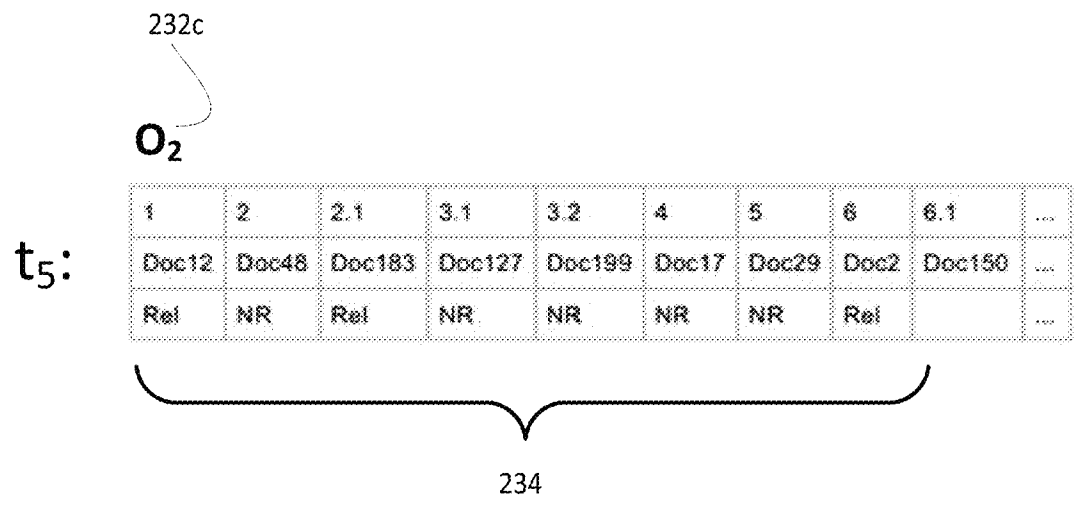

Turning now to FIGS. 2A-2C, illustrated is an example process for ordering a pool of documents, such as a pool of documents maintained at the database 130 of FIG. 1, as documents are added and removed from the pool of documents. Starting with FIG. 2A, the pool of documents initially includes 100 documents sorted into the order 232a ("$O_0$"). As described above, as the documents are ingested into a workspace (such as the workspace 110 of FIG. 1), an ingestion module (such as the ingestion module 112 of FIG. 1) may assign each document a random number. Accordingly, the ordering 232a may reflect an ordering of the documents in the pool of documents in descending order of the random number assigned to the documents.

As illustrated, at time $t_1$ the documents Doc12, Doc48, Doc91, and Doc2 have been presented to a reviewer (such as via the review platform 120 of FIG. 1) and are associated with labeling decisions ("Rel" for relevant and "NR" for not relevant). As described above, when documents are included in a review queue (such as the review queue 122 of FIG. 1) in response to a selection algorithm requesting a random document, documents are provided sequentially in accordance with the order 232a. It should be appreciated that the selection algorithm may request documents be inserted into the review queue for other reasons (e.g., a highest score applied by a classifier). Accordingly, the pool of documents may include an initial set of documents 234, as well as other documents interspersed throughout the ordering 232a associated with labeling decisions.

As described elsewhere herein, an analytics module (such as the statistics module 116 of FIG. 1) may define a random sample of the pool of documents to be the initial set of documents 234. Accordingly, at time $t_1$, the random sample includes documents $205_1$ to $205_3$. As reviewers review additional documents, the size of the initial set of documents 234 also increases. Additionally, the proportion of responsive documents also changes. As illustrated, at time $t_2$, the random sample includes documents $205_1$ to $205_6$. It should be appreciated that due to selection algorithm selecting documents for reasons other than generating the random sample, the size of the initial set of documents 234 may grow by any number in response to the labeling decision applied to a single document. For example, when the document $205_5$ was labeled, the initial set of documents grew by two documents (documents $205_5$ and $205_6$).

Turning now to FIG. 2B, illustrated is an example process for updating the ordering 232a in response to an additional 100 documents being ingested into the pool of documents. When the additional 100 documents are ingested into the workspace, the ingestion module associates the new documents with a random number generated using the same random number generation technique applied to the initial 100 documents. The analytics module then sorts the additional documents into the pool of documents to generate the ordering 232b ("$O_1$"). More particularly, the analytics module may use the same sorting technique applied to the initial pool of documents such that the sorting results in new documents being randomly interleaved into ordering 232b.

As illustrated, at time $t_3$, new document Doc183 is interleaved after Doc48 and Doc127 and Doc199 are interleaved after Doc 91. Because the additional documents have only just been ingested into the workspace, at time $t_3$ none of the additional documents are associated with labeling decisions yet. Accordingly, at time $t_3$, the size of the initial set of documents 234 has shrunk to two documents.

However, as reviewers continue to review documents via the review platform, the analytics module continues to provide random documents in accordance with the updated ordering 232b. Accordingly, the gaps will be filled in throughout the ongoing review process, thereby recapturing previously included documents back into the random sample. For example, as illustrated, reviewing three additional documents based on the ordering 232b results in the initial set of documents 234 having nine documents at time $t_4$.

Conversely, when conventional random sampling techniques are applied, a new sample is generated from the entire pool of documents. In many scenarios, the pool of documents includes hundreds of thousands (if not millions) of documents, and only a small percentage of which are associated with manually-applied labels. Thus, when applying the conventional techniques, if a random sample is drawn when the pool was a relatively small size, the documents in the original random sample are unlikely to represent a significant proportion of the newly-drawn random sample. As a result, conventional techniques require either reviewing a significant number of documents to generate a random sample representative of the pool of documents or relying on an old random sample that may no longer be representative of the current pool of documents. Said another way, the instant techniques for maintaining a random sample are able to significantly reduce the number of documents needed to be manually reviewed when the pool of document changes in size and/or variety while still maintaining the representative nature of the random sample.

Turning now to FIG. 2C, illustrated is an example process for updating the ordering 232b in response to documents being removed from the pool of documents. For example, in the illustrated scenario, documents Doc75 to Doc125 have been removed from the pool of documents. Accordingly, the document $205_3$ is no longer included in the ordering 232c ("$O_2$"). As such, after the documents have been removed at time $t_5$, there are only eight documents in the initial set of documents 234.

When removing the documents, the analytics platform may maintain the random number assigned to the documents. That is, the workspace 110 may maintain data to track documents that have been removed from the pool of documents. For example, the workspace may store a hash of a portion of the document and the random number assigned to the document. Accordingly, as the ingestion module ingests additional documents into the workspace, the ingestion module may calculate and compare hash values for newly-ingested documents to stored hash values detect that a new document had previously been previously assigned a random number. By maintaining the random number assignment even after documents are removed from the pool, techniques disclosed herein are able to prevent data custodians from gaming the composition of the random sample by removing specific documents included therein and then re-ingesting the same document.

Figure 3:
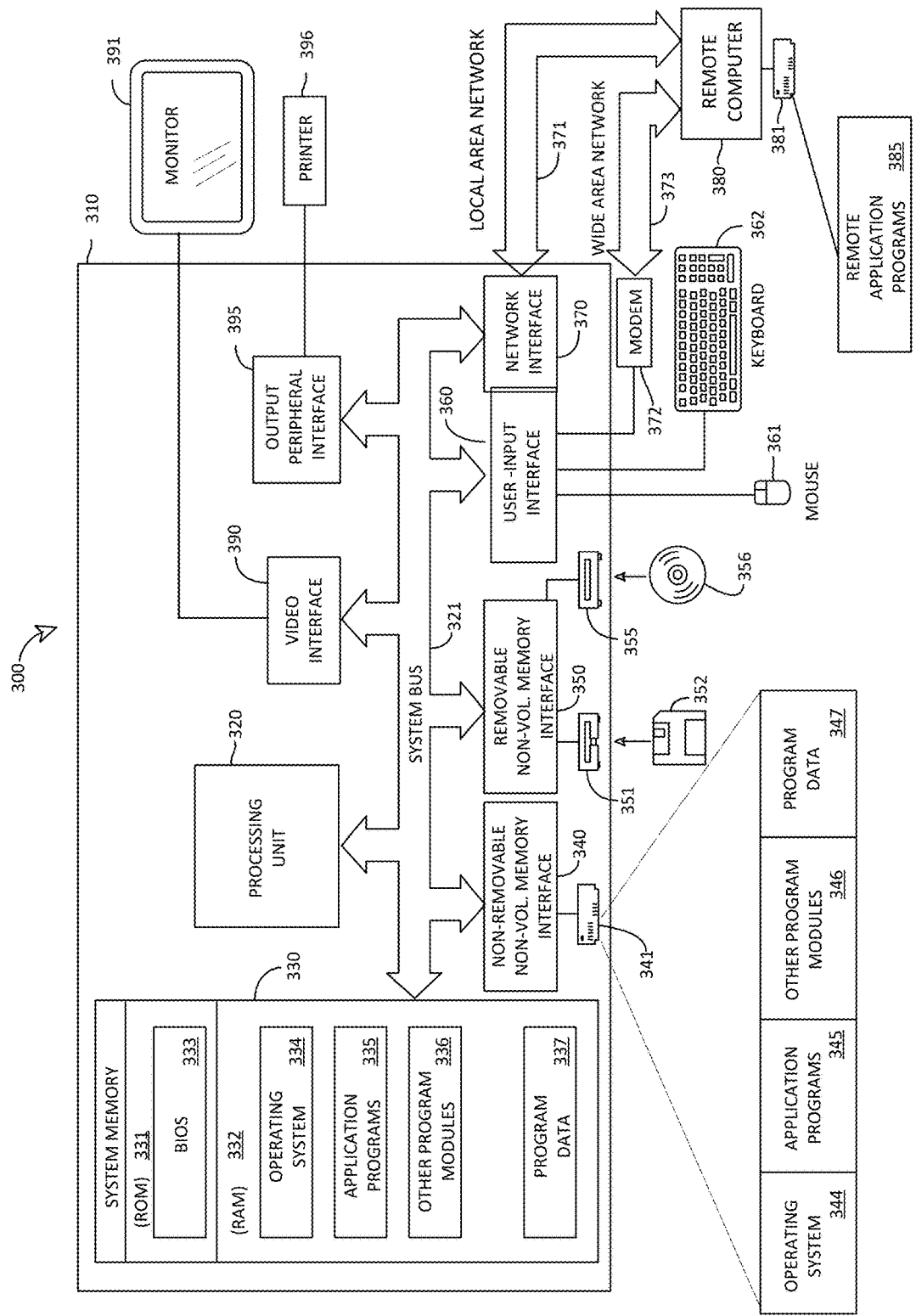
FIG. 3 depicts an example computing system in which the techniques described herein may be implemented, according to one embodiment.

Turning now to FIG. 3, FIG. 3 depicts an example computing system 300 in which the techniques described herein may be implemented, according to an embodiment. For example, the computing system 300 of FIG. 3 may be a computing system configured to implement the workspace 110 of FIG. 1. The computing system 300 may include a computer 310. Components of the computer 310 may include, but are not limited to, a processing unit 320, a system memory 330, and a system bus 321 that couples various system components including the system memory 330 to the processing unit 320. In some embodiments, the processing unit 320 may include one or more parallel processing units capable of processing data in parallel with one another. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 3 provide storage of computer-readable instructions, data structures, program modules and other data for the computer 310. In FIG. 3, for example, hard disk drive 341 is illustrated as storing operating system 344, application programs 345, other program modules 346 (such as the modules 112, 114, 116 and review platform 120 of FIG. 1), and program data 347 (such as the review queue 122 and ordering 132 of FIG. 1). Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers 380, such as the reviewer device 140 of FIG. 1. The remote computer 380 may be a personal computer, a server, a router, a network PC, a peer device or other common network node, and may include many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 3 illustrates remote application programs 385 as residing on memory device 381.

The techniques for maintaining a random sample of a pool of documents described above may be implemented in part or in their entirety within a computing system such as the computing system 300 illustrated in FIG. 3. In some embodiments, the computing system 300 is a server computing system communicatively coupled to a local workstation (e.g., a remote computer 380) via which a user interfaces with the computing the computing system 300. For example, the computer 310 may be configured to send data to the local workstation for presentation thereat to facilitate overview of a review process for the pool of documents.

In some embodiments, the computing system 300 may include any number of computers 310 configured in a cloud or distributed computing arrangement. Accordingly, the computing system 300 may include a cloud computing manager system (not depicted) that efficiently distributes the performance of the functions described herein between the computers 310 based on, for example, a resource availability of the respective processing units 320 or system memories 330 of the computers 310. In these embodiments, the documents in the pool of documents may be stored in a cloud or distributed storage system (not depicted) accessible via the interfaces 371 or 373. Accordingly, the computer 310 may communicate with the cloud storage system to access the documents within the corpus of documents, for example, when obtaining a batch of documents included in a review queue, such as the review queue 122 of FIG. 1.

Figure 4:
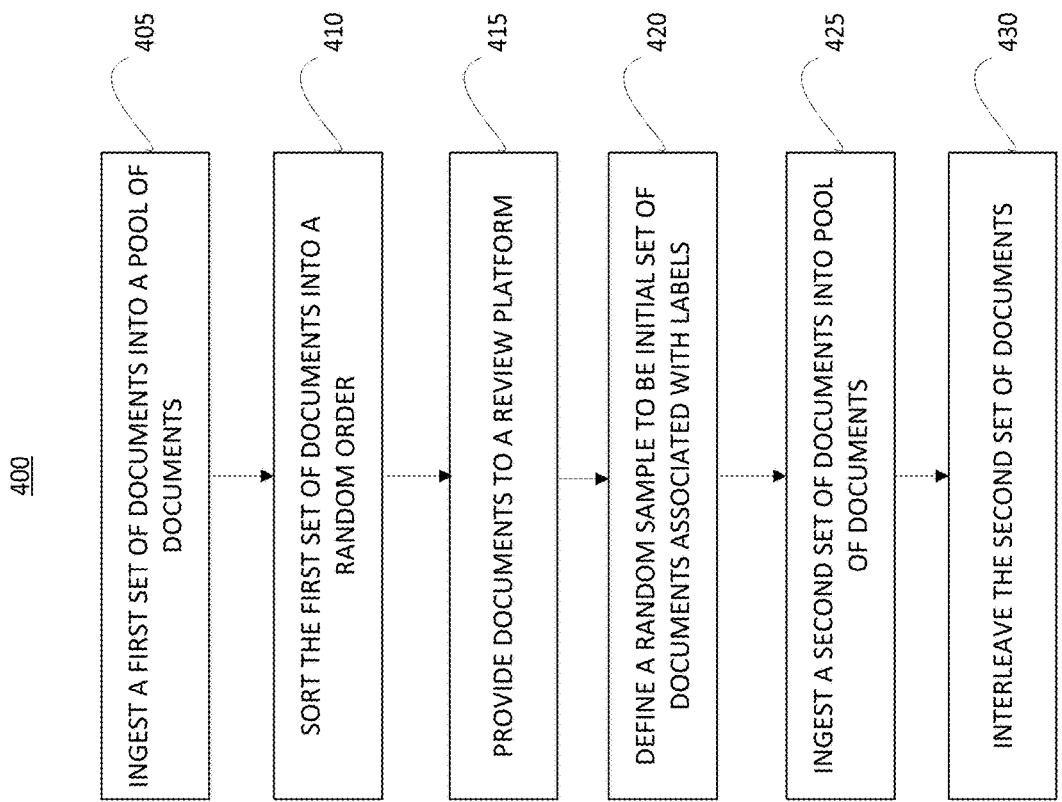
FIG. 4 depicts a flow diagram of an example method for self-training an electronic communication document parser, according to one embodiment.

FIG. 4 depicts a flow diagram of an example method 400 for maintaining a random sample of documents, in accordance with the techniques described herein. The method 400 may be implemented by one or more processors of one or more computing devices, such as the computing system 300 of FIG. 3, configured to host a workspace (such as the workspace 110 of FIG. 1), for example.

The method 400 may begin at block 405 when the computing system ingests a first set of documents into a pool of documents (such as documents maintained at the database 130 of FIG. 1). For example, as part of the ingestion process, an ingestion module (such as the ingestion module 112 of FIG. 1) may assign documents in the first set of documents a random number. The ingestion module may also perform any other typical pre-processing of documents performed when ingesting documents.

At block 410, the computing system sorts the first set of documents into a random order to generate an initial ordering (such as the orderings 132, 232 of FIGS. 1-2C) of the pool of documents. For example, the ingestion module may assign documents in the first set of documents a random number and then sort the first set of documents based upon the corresponding random numbers (e.g., in ascending or descending order).

At block 415, the computing system provides documents within the pool of documents to a review platform (such as the review platform 120 of FIG. 1) based at least in part upon the initial ordering of the pool of documents. For example, the computing system may maintain a review queue of documents and select documents from the ordering when inserting a random document into the review queue. In some embodiments, the computing system additionally provides documents within the pool of documents to a review platform based at least in part upon a priority score assigned by a classifier.

At block 420, the computing system defines the random sample of documents to be an initial set of documents within an ordering of the pool of documents associated with labels applied via the review platform. It should be appreciated that as additional documents are reviewed via the review platform, the initial set of documents also changes in size and/or variety. Although the method 400 includes block 420 in a sequential order, it should be appreciated that the step of defining the random sample of documents may occur at any point during the document review process, and may occur repeatedly and/or continuously as documents are reviewed.

At block 425, the computing system ingests a second set of documents into the pool of documents. For example, the ingestion module may assign documents in the second set of documents a random number using the same random number generator to generate the random numbers assigned to the first set of documents.

At block 430, the computing system interleaves the second set of documents into the initial ordering of documents to generate an updated ordering of the pool of documents wherein the documents within the first set of documents remain in a same relative order with respect to other documents within the first set of documents. In some embodiments, the computing system may interleave the second set of documents such that the pool of documents is sorted based upon the corresponding random numbers. For example, the computing system may implement techniques described with respect to FIG. 2B to interleave the second set of documents.

In some embodiments, the computing system may detect that a document has been removed from the pool of documents. Accordingly, the computing system may remove the removed document from the ordering of the pool documents. It should be appreciated that in some embodiments, removing the removed document from the ordering of the pool of documents maintains a correspondence between the removed document and the assigned random number. For example, the computing system may implement techniques described with respect to FIG. 2C to process the removed document.

In some embodiments, the method 400 includes the computing system analyzing the labels associated with the random sample of documents to generate a metric associated with the pool of documents. For example, in embodiments where the labels applied via the review platform indicate a responsiveness to an inquiry, the metric associated with the pool of documents may be a richness of documents responsive to the inquiry. Additionally, the computing system may calculate at least one of a precision, recall, or elusion of a classifier based upon the richness metric. In some embodiments, the computing system tracks historical values for the metric as additional documents are reviewed via the review platform.

ADDITIONAL CONSIDERATIONS

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for practicing the techniques disclosed herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method for maintaining a random sample of documents, the method comprising:
    ingesting, via one or more processors, a first set of documents into a pool of documents;
    sorting, via the one or more processors, the first set of documents into a random order to generate an initial ordering of the pool of documents;
    providing, via the one or more processors, documents within the pool of documents to a review platform based at least in part upon the initial ordering of the pool of documents;
    defining, via the one or more processors, the random sample of documents to be an initial set of documents within an ordering of the pool of documents associated with labels applied via the review platform, wherein the initial set of documents changes in size as additional documents are reviewed via the review platform;
    ingesting, via one or more processors, a second set of documents into the pool of documents; and
    interleaving, via the one or more processors, the second set of documents into the initial ordering of documents to generate an updated ordering of the pool of documents wherein the documents within the first set of documents remain in a same sequential order with respect to other documents within the first set of documents.

2. The method of claim 1, further comprising:
    analyzing, via the one or more processors, the labels associated with the random sample of documents to generate a metric associated with the pool of documents.

3. The method of claim 2, wherein:
    the labels applied via the review platform indicate a responsiveness to an inquiry; and
    the metric associated with the pool of documents is a richness of documents responsive to the inquiry.

4. The method of claim 3, further comprising:
    calculating, via the one or more processors, at least one of a precision, recall, or elusion of a classifier based upon the richness metric.

5. The method of claim 2, wherein generating the metric comprises:
    tracking, via the one or more processors, historical values for the metric as additional documents are reviewed via the review platform.

6. The method of claim 1, wherein sorting the first set of documents comprises:
    assigning, by the one or more processors, documents in the first set of documents a random number; and
    sorting, by the one or more processors, the first set of documents based upon the corresponding random numbers.

7. The method of claim 6, wherein interleaving the second set of documents comprises:
    assigning, by the one or more processors, documents in the second set of documents a random number; and
    interleaving, by the one or more processors, the second set of documents such that the pool of documents is sorted based upon the corresponding random numbers.

8. The method of claim 6, further comprising:
    detecting, via the one or more processors, that a document has been removed from the pool of documents; and
    removing, via the one or more processors, the removed document from the ordering of the pool documents.

9. The method of claim 8, wherein:
    removing the removed document from the ordering of the pool of documents maintains a correspondence between the removed document and the assigned random number.

10. The method of claim 1, wherein providing the documents within the pool of documents to the review platform further comprises:
    providing, via the one or more processors, documents within the pool of documents to a review platform based at least in part upon a priority score assigned by a classifier.

11. A system for maintaining a random sample of documents, the system comprising:
    one or more processors; and
    one or more non-transitory memories storing processor-executable instructions that, when executed by the one or more processors, cause the system to:
        ingest a first set of documents into a pool of documents;
        sort the first set of documents into a random order to generate an initial ordering of the pool of documents;
        provide documents within the pool of documents to a review platform based at least in part upon the initial ordering of the pool of documents;
        define the random sample of documents to be an initial set of documents within an ordering of the pool of documents associated with labels applied via the review platform, wherein the initial set of documents changes in size as additional documents are reviewed via the review platform;
        ingest a second set of documents into the pool of documents; and
        interleave second set of documents into initial ordering of documents to generate an updated ordering of the pool of documents wherein the documents within the first set of documents remain in a same sequential order with respect to other documents within the first set of documents.

12. The system of claim 11, wherein the instructions, when executed by the one or more processors, cause the system to:
  analyze the labels associated with the random sample of documents to generate a metric associated with the pool of documents.

13. The system of claim 12, wherein:
  the labels applied via the review platform indicate a responsiveness to an inquiry; and
  the metric associated with the pool of documents is a richness of documents responsive to the inquiry.

14. The system of claim 13, where the instructions, when executed by the one or more processors, cause the system to:
  calculate at least one of a precision, recall, or elusion of a classifier based upon the richness metric.

15. The system of claim 12, wherein to generate the metric, the instructions, when executed by the one or more processors, cause the system to:
  track historical values for the metric as additional documents are reviewed via the review platform.

16. The system of claim 11, wherein to sort the first set of documents, the instructions, when executed by the one or more processors, cause the system to:
  assign documents in the first set of documents a random number; and
  sort the first set of documents based upon the corresponding random numbers.

17. The system of claim 16, wherein to interleave the second set of documents, the instructions, when executed by the one or more processors, cause the system to:
  assign documents in the second set of documents a random number; and
  interleave the second set of documents such that the pool of documents is sorted based upon the corresponding random numbers.

18. The system of claim 16, wherein the instructions, when executed by the one or more processors, cause the system to:
  detect that a document has been removed from the pool of documents; and
  remove the removed document from the ordering of the pool documents.

19. The system of claim 18, wherein:
  removing the removed document from the ordering of the pool of documents maintains a correspondence between the removed document and the assigned random number.

20. A non-transitory computer-readable storage medium storing processor-executable instructions, that when executed cause one or more processors to:
  ingest a first set of documents into a pool of documents;
  sort the first set of documents into a random order to generate an initial ordering of the pool of documents;
  provide documents within the pool of documents to a review platform based at least in part upon the initial ordering of the pool of documents;
  define a random sample of documents to be an initial set of documents within an ordering of the pool of documents associated with labels applied via the review platform, wherein the initial set of documents changes in size as additional documents are reviewed via the review platform;
  ingest a second set of documents into the pool of documents; and
  interleave second set of documents into the initial ordering of documents to generate an updated ordering of the pool of documents wherein the documents within the first set of documents remain in a same sequential order with respect to other documents within the first set of documents.

* * * * *